United States Patent
Huynh

(10) Patent No.: US 7,469,042 B2
(45) Date of Patent: *Dec. 23, 2008

(54) METHOD AND APPARATUS OF DETECTION OF INTER-CARRIER LOOPING

(75) Inventor: Phu Khanh Huynh, Staten Island, NY (US)

(73) Assignee: AT&T Corp., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/930,317

(22) Filed: Oct. 31, 2007

(65) Prior Publication Data

US 2008/0056478 A1    Mar. 6, 2008

Related U.S. Application Data

(63) Continuation of application No. 11/322,428, filed on Dec. 30, 2005, now Pat. No. 7,366,288, which is a continuation of application No. 10/748,808, filed on Dec. 30, 2003, now Pat. No. 7,010,102.

(60) Provisional application No. 60/462,091, filed on Apr. 10, 2003.

(51) Int. Cl.
*H04M 15/00*    (2006.01)
*H04M 3/42*    (2006.01)

(52) U.S. Cl. .................. 379/112.1; 379/112.04; 379/112.05; 379/221.07; 379/221.14

(58) Field of Classification Search ............ 379/112.04, 379/112.05, 112.1, 219, 220.01, 221.03, 379/221.06, 221.07, 221.14, 229, 230; 370/229, 370/395.31, 400, 403–406
See application file for complete search history.

(56) References Cited

U.S. PATENT DOCUMENTS

| | | | |
|---|---|---|---|
| 5,014,262 | A | 5/1991 | Harshavardhana |
| 5,889,847 | A | 3/1999 | Copley et al. |
| 6,331,985 | B1 | 12/2001 | Coden |
| 6,343,122 | B1 | 1/2002 | Andersson |
| 6,421,440 | B1 | 7/2002 | Copley et al. |
| 6,826,273 | B1 | 11/2004 | Kaplan et al. |
| 7,010,102 | B1 | 3/2006 | Huynh |
| 7,366,288 | B1 * | 4/2008 | Huynh ............ 379/112.1 |
| 2003/0200298 | A1 | 10/2003 | Su et al. |
| 2003/0229613 | A1 | 12/2003 | Zargham et al. |
| 2004/0028032 | A1 | 2/2004 | Rantanen et al. |
| 2004/0062376 | A1 | 4/2004 | Woodson et al. |
| 2004/0190705 | A1 | 9/2004 | Taff et al |

* cited by examiner

*Primary Examiner*—Quoc D Tran

(57) ABSTRACT

Method and apparatus for detecting inter-carrier call looping. In one embodiment, the present invention is a method that can be used to reliably detect inter-network routing loops and kill associated calls using a modified ISUP Hop Counter parameter to be sent across network boundaries. Detection of inter-network loops prevents routing loops, those involving two or more carrier networks, from generating additional signaling traffic that can aggregate to overload signaling networks.

20 Claims, 5 Drawing Sheets

100

| 8 | 7 | 6 | 5 | 4 | 3 | 2 | 1 |
|---|---|---|---|---|---|---|---|
| H | G | F | E | D | C | B | A |

Hop Counter value:
bits E D C B A: *Hop Counter field*
bits H G F: *Spare (000)*

| 8 | 7 | 6 | 5 | 4 | 3 | 2 | 1 |
|---|---|---|---|---|---|---|---|
| H | G | F | E | D | C | B | A |

Hop Counter value:
bits E D C B A: *Hop Counter field*
bits H G F: *Network Counter field*

FIG. 3

METHOD AND APPARATUS OF DETECTION OF INTER-CARRIER LOOPING

This application is a continuation of U.S. patent application Ser. No. 11/322,428, filed on Dec. 30, 2005 now U.S. Pat. No. 7,366,288, which is a continuation of U.S. patent application Ser. No. 10/748,808, filed on Dec. 30, 2003, which has issued as U.S. Pat. No. 7,010,102, and claims the benefit of U.S. Provisional Application No. 60/462,091 filed on Apr. 10, 2003, where each of the above referenced applications is herein incorporated by reference.

The present invention relates generally to communication networks and, more particularly, to a method and apparatus of accurately detecting inter-carrier looping for a call, e.g., in a Signaling System #7 (SS7) network.

BACKGROUND OF THE INVENTION

In a Signaling System #7 (SS7) network, both ANSI and Telcordia standards recommend implementation of the optional Hop Counter parameter in the ISDN User Part (ISUP) Initial Address Message (IAM) as a procedure to detect call routing loops caused by Common Channel Signaling Switching Office (CCSSO) translation errors. In situations where carriers decide to implement the Hop Counter only as an intra-network procedure, and not as an inter-network procedure, the Hop Counter procedure then can only be used to detect intra-network routing loops. In these scenarios, inter-network routing loops cannot be detected and these calls will generate additional signaling traffic that can aggregate to overload signaling networks.

Therefore, a need exists for a method to reliably detect inter-network routing loops and kill associated calls using a modified ISUP Hop Counter parameter to be sent across network boundaries.

SUMMARY OF THE INVENTION

In one embodiment, the present invention is a method that can be used to reliably detect inter-network routing loops and kill associated calls using a modified ISUP Hop Counter parameter to be sent across network boundaries. Detection of inter-network loops prevents routing loops, those involving two or more carrier networks, from generating additional signaling traffic that can aggregate to overload signaling networks.

BRIEF DESCRIPTION OF THE DRAWINGS

The teaching of the present invention can be readily understood by considering the following detailed description in conjunction with the accompanying drawings, in which:

FIG. 1 illustrates the encoding of the Hop Counter Value field as defined by ISUP;

FIG. 3 illustrates the encoding of the modified Hop Counter parameter to incorporate the Network Counter field of the present invention;

To facilitate understanding, identical reference numerals have been used, where possible, to designate identical elements that are common to the figures.

DETAILED DESCRIPTION

The present invention relates broadly to connection-oriented communication networks. These networks include, but are not limited to, a circuit switched network using SS7 signaling protocols. Thus, the present invention can be adapted to communication networks using other signaling protocols that experience problems that are similar to inter-network routing loops.

SS7 standards recommend that the Hop Counter parameter be encoded as shown below. The Hop Counter parameter is a 3 octet parameter consisting of an one octet name field, an one octet length field, and an one octet Hop Counter Value field. The parameter is encoded as:

| Octet | Field | Encoded Value |
| --- | --- | --- |
| 1 | Parameter Name | 00111101 |
| 2 | Length | 00000001 |
| 3 | Hop Counter | HGFEDCBA |

The Hop Counter Value field 100 is shown in FIG. 1. H, G, and F spare bits of the Hop Counter field are unused and are encoded with the value of "000". The value of E, D, C, B, A bits of the Hop Counter Value field is a 5 bit value of the hop count of the number of contiguous SS7 interexchange circuits that are allowed to complete a call.

Under the Hop Counter procedure specified in the standards, the value of the 5 bit Hop Counter field is decremented by 1 at each intermediate switch and the call is killed when a 1 or 0 is received. The H, G, F bits of the Hop Counter Value field are not used by an intermediate switch. Note that this Hop Counter procedure applies only to intermediate switches. The use of the Hop Counter procedure across a network boundary shall be negotiated and agreed upon between interconnecting carriers before this feature is enabled.

In a SS7 network in which the Hop Counter procedure is implemented such that it only tracks the number of contiguous switches traversed within that network, any incoming Hop Counter Value received in an incoming IAM message on a network interconnect trunk from another carrier will be ignored. The interconnecting switch will set the outgoing Hop Counter Value to a predetermined value instead of decrementing the received Hop Counter when sending it in the outgoing IAM message. Resetting of the Hop Counter value when received across network boundaries can cause inter-network looping as shown FIG. 2.

Figure 2:
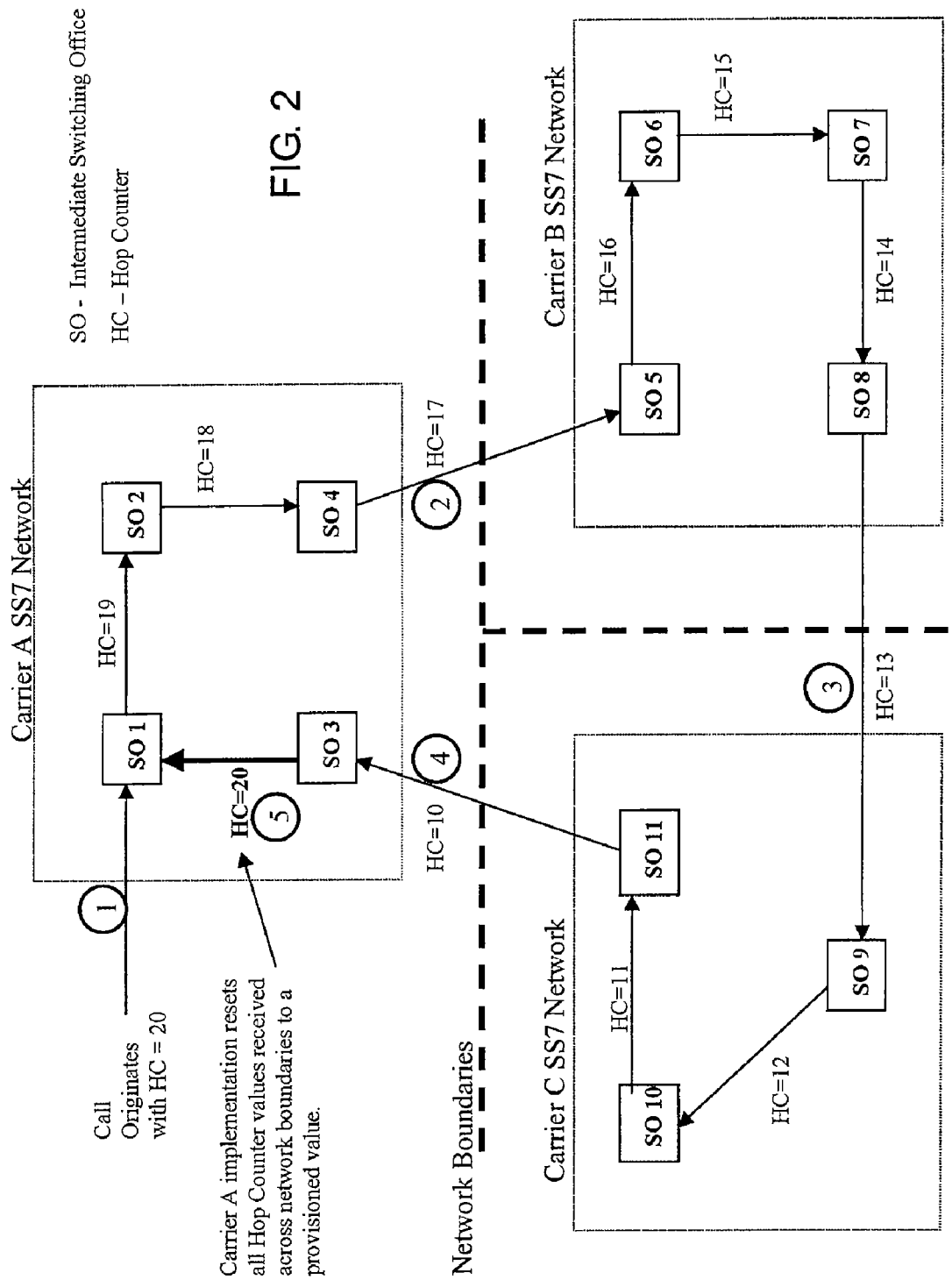
FIG. 2 illustrates an example of inter-carrier looping in a network with a plurality of SS7 networks operated by different carriers and a plurality of switches in each SS7 network.

In FIG. 2, an exemplary network 200 comprising a plurality of carriers A-C, e.g., long distance and/or local telephone service providers, a plurality of interconnected SS7 networks, a plurality of switches SO01-SO11, and a sequence of ordered events, 1-5, that occurred in the network.

Assume the followings for network 200:
Carrier B is Carrier A's egress carrier
Carrier C is Carrier B's egress carrier
Carrier A is Carrier C's egress carrier.

The following is a sequence of ordered events that occur in network 200 in FIG. 2.

(1) A call originates at or is sent to Carrier A for termination. Carrier A sets the initial Hop Counter field value to 20.

(2) Carrier A has an agreement with Carrier B to terminate some of its traffic so the call is provisioned to be sent to Carrier B for termination. Let's assume that Carrier B does not reset the received Hop Counter field value but decrements it.

(3) Carrier B has an agreement with Carrier C to terminate some of its traffic so the call is provisioned to be sent to Carrier C for termination. Again, assume that Carrier C does not reset the received Hop Counter field value but decrements it.

(4) Finally, Carrier C has an agreement with Carrier A to terminate some of its traffic so the call once again enters Carrier A network.

(5) Because Carrier A resets Hop Counter Value received across network boundaries, the Hop Counter field value is reinitialized to a provisioned value of 20 and the call enters a looping state.

The Hop Counter is recommended as a procedure to detect call looping but if Carriers decide not to accept Hop Counter across network boundaries, due to mistrust or lack of Interconnection Agreements (ICA), the Hop Counter field value cannot be used to detect inter-carrier looping. If the Hop Counter field value is not allowed to be decremented per procedure when passed between networks, the effective value will never reach 1 or 0 to kill a looping call.

To address this criticality, the present invention provides a method and apparatus of detecting inter-carrier looping within a SS7 network.

The present invention uses a modified Hop Counter parameter using the 3 spare bits, H, G, and F, that were not used in the original Hop Counter parameter. The modified Hop Counter parameter is a 3 octet parameter consisting of an one octet parameter name field, an one octet length field, and an one octet Hop Counter Value field. The parameter is encoded as:

| Octet | Field | Encoded Value |
|---|---|---|
| 1 | Parameter Name | 00111101 |
| 2 | Length | 00000001 |
| 3 | Hop Counter | HGFEDCBA |

The Hop Counter Value field 300 is shown in FIG. 3. The value of H, G, and F bits of the Hop Counter Value field is a 3 bit Network Counter field which is the value of the number of contiguous SS7 networks that a call has traversed. The value of the E, D, C, B, A bits of the Hop Counter field remains the same as specified by ANSI and Telcordia standards, which is a 5 bit value field of the hop count of the number of contiguous SS7 interexchange circuits that are allowed to complete a call.

The Network Counter field can have a range between 0 and 7, and is incremented by one at the receiving switch each time it crosses a network boundary. Network managers will decide upon a "threshold" Network Counter value between 1 and 7 that will be set to kill a call if a received Network Counter reaches this value. In one embodiment, the Network Counter default value for a call to be killed shall be set at 7. The usage and the processing requirements of the 5 bit Hop Counter Value field remains the same as previously discussed.

The method of processing the Network Counter field by an intermediate switch within a carrier network is:

If a Hop Counter parameter is received in an incoming IAM but the Network Counter field is not set or is equal to 0, and the Hop Counter parameter must be included in the outgoing IAM, the switch shall populate the outgoing Network Counter field with an initial value of 1;

If a Hop Counter parameter is received in an incoming IAM and the Network Counter field has a value between 1 and 7, and the Hop Counter parameter must be included in the outgoing IAM, the switch shall pass this value unchanged in the outgoing Network Counter field;

If a Hop Counter parameter is not received in an incoming IAM but a Hop Counter parameter must be included in an outgoing IAM, the switch shall populate the outgoing Network Counter field with an initial value of 1.

Figure 5:
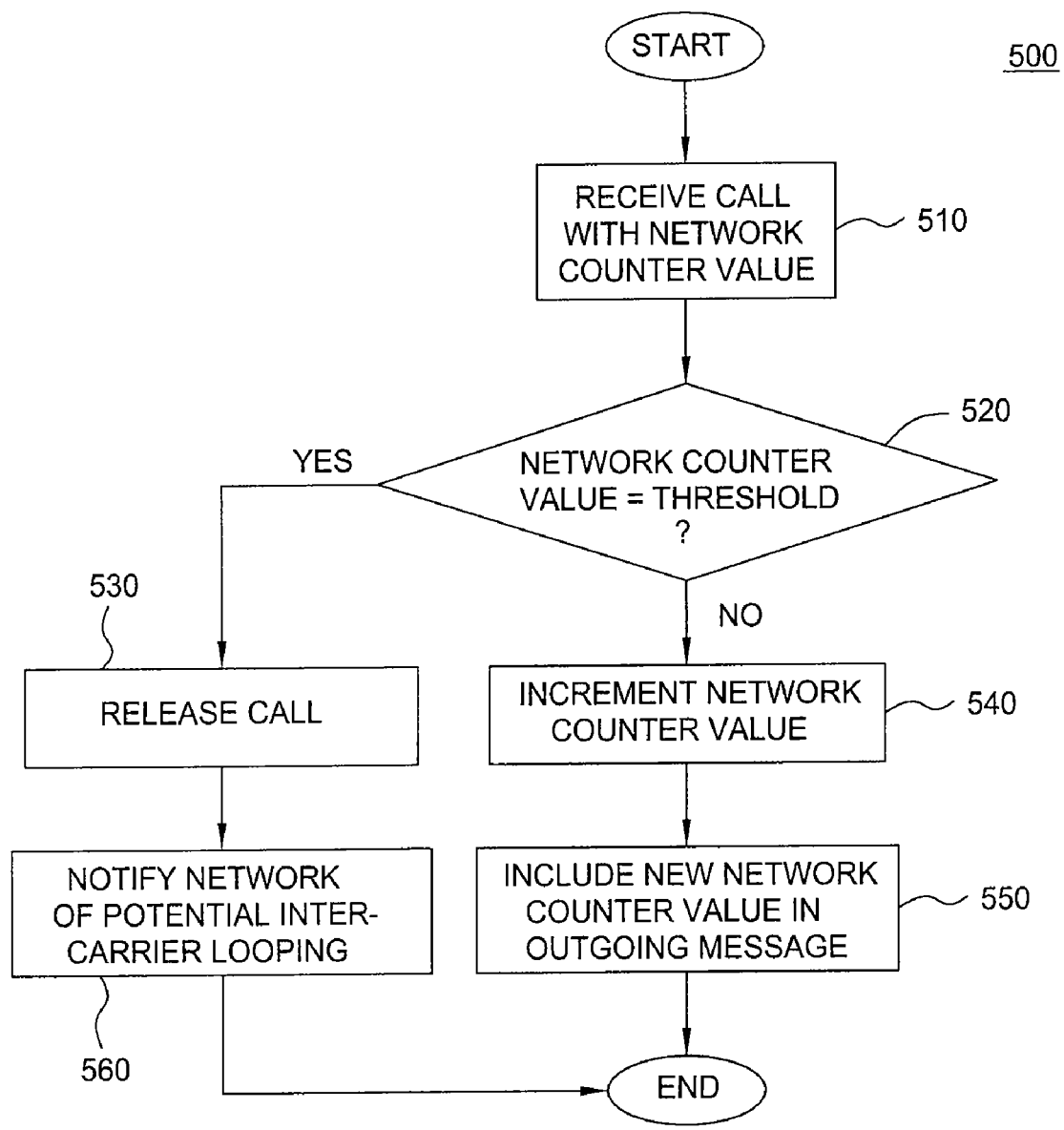
FIG. 5 illustrates a flowchart of a method for detecting inter-carrier looping of the present invention.

FIG. 5 illustrates a method 500 for detecting inter-carrier looping of the present invention. Specifically, the method of processing the Network Counter field across a network boundary by an access switch is:

If the Hop Counter parameter is received (block 510) in an incoming IAM across a network boundary and the Network Counter field value is equal to the pre-determined "threshold" value (e.g., default=7) (block 520), the network access switch shall release the call with a Release Message (REL) with the cause value of "exchange routing error" (Block 530). The switch then can notify network maintenance of the potential inter-carrier looping condition (Block 560);

If the Hop Counter parameter is received (block 510) in an incoming IAM across a network boundary and the Network Counter field value is less than the "threshold" value (e.g., default=7) (block 520), the access switch shall increment the Network Counter value by 1 (Block 540) and includes this value in the Network Counter field of the Hop Counter parameter in the outgoing IAM (Block 550).

Figure 4:
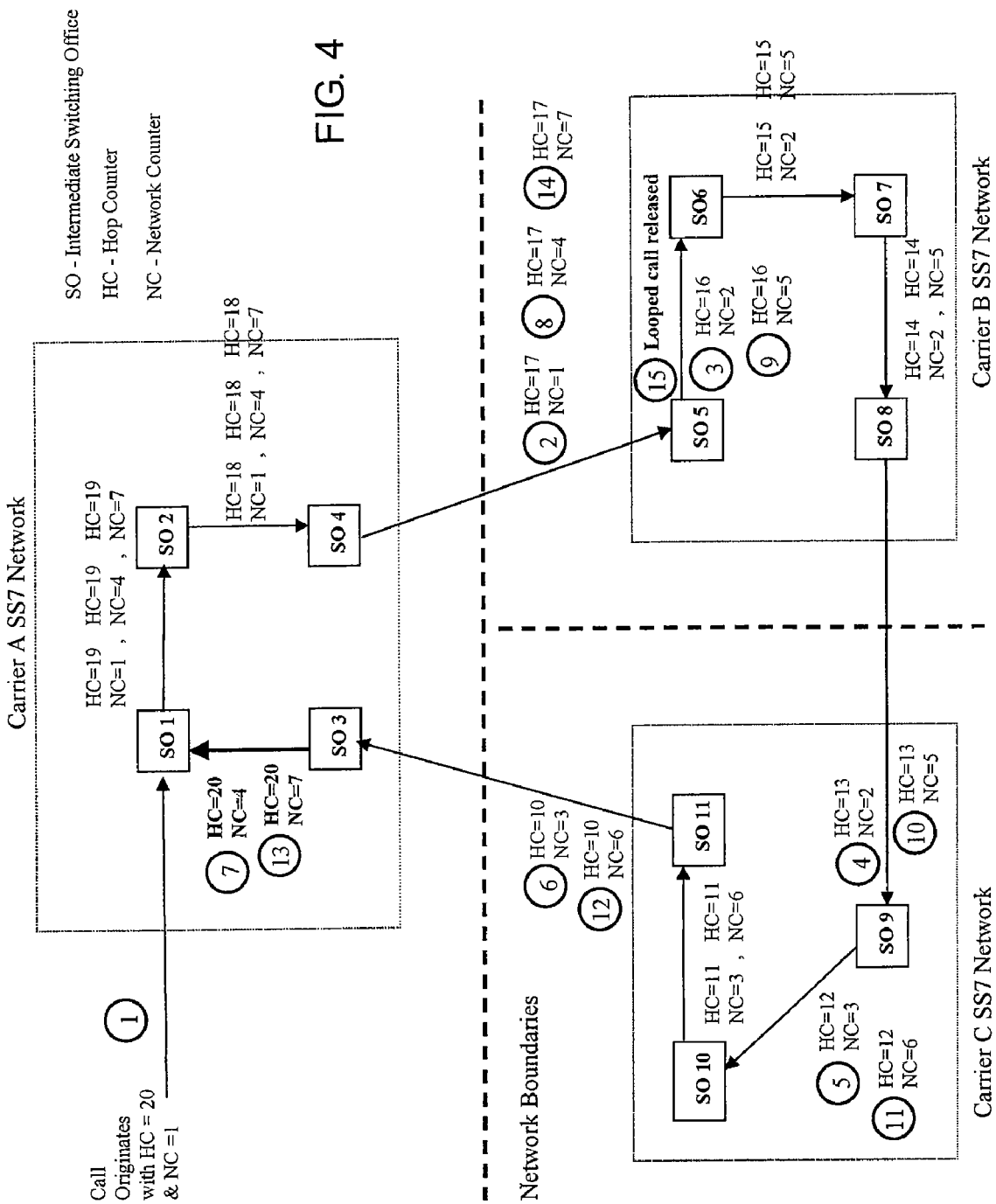
FIG. 4 illustrates an example of inter-carrier looping in a network with a plurality of SS7 networks operated by different carriers supporting the Network Counter field.

To better understand the present invention, an exemplary communication network 400 of the present invention is shown in FIG. 4. The communication network 400 comprises a plurality of carriers A-C, a plurality of interconnected SS7 networks, a plurality of switches SO01-SO11, and a sequence of ordered events, 1-11, that occurred in the network.

Again assume the followings for network 400:

Carrier B is Carrier A's egress carrier
Carrier C is Carrier B's egress carrier
Carrier A is Carrier C's egress carrier.

The following is a sequence of ordered events that may occur in network 400 in FIG. 4.

(1) A call originates at or is sent to Carrier A for termination. Carrier A sets the initial Hop Counter field value to 20 and the initial Network Counter field value to 1.

(2) Carrier A has an agreement with Carrier B to terminate some of its traffic so the call is provisioned to be sent to Carrier B for termination. The Hop Counter field value is 17 and the Network Counter field value is 1 before the call is processed by the access switch of Carrier B.

(3) Carrier B does not reset the received Hop Counter Value but decrements it and carrier B also increments the Network Counter field. The Hop Counter field value is 16 and the Network Counter field value is 2 after the call is processed by the access switch (SO 5) of Carrier B.

(4) Carrier B has an agreement with Carrier C to terminate some of its traffic so the call is provisioned to be sent to Carrier C for termination. The Hop Counter field value is 13 and the Network Counter field value is 2 before the call is processed by the access switch of Carrier C.

(5) Carrier C does not reset the received Hop Counter field value but decrements it and carrier C also increments the Network Counter field value. The Hop Counter field value is 12 and the Network Counter field value is 3 after the call is processed by the access switch (SO 9) of Carrier C.

(6) Carrier C has an agreement with Carrier A to terminate some of its traffic so the call once again enters Carrier A network. The Hop Counter field value is 10 and the Network Counter field value is 3 before the call is processed by the access switch (SO 3) of Carrier A.

(7) Carrier A resets Hop Counter field value received across network boundaries, the Hop Counter field value is reinitialized to a provisioned value of 20 and the Network Counter field value is incremented to a value of 4. Now, the call enters a looping state.

(8) Carrier A has an agreement with Carrier B to terminate some of its traffic so the call is provisioned to be sent to Carrier B for termination. The Hop Counter field value is 17 and the Network Counter field value is 4 before the call is processed by the access switch (SO 5) of Carrier B.

(9) Carrier B does not reset the received Hop Counter field value but decrements it and carrier B also increments the Network Counter field value. The Hop Counter field value is 16 and the Network Counter field value is 5 after the call is processed by the access switch of Carrier B.

(10) Carrier B has an agreement with Carrier C to terminate some of its traffic so the call is provisioned to be sent to Carrier C for termination. The Hop Counter field value is 13 and the Network Counter field value is 5 before the call is processed by the access switch (SO 9) of Carrier C.

(11) Carrier C does not reset the received Hop Counter field value but decrements it and carrier C also increments the Network Counter field value. The Hop Counter field value is 12 and the Network Counter field value is 6 after the call is processed by the access switch of Carrier C.

(12) Carrier C has an agreement with Carrier A to terminate some of its traffic so the call once again enters Carrier A network. The Hop Counter field value is 10 and the Network Counter field value is 6 before the call is processed by the access switch (SO 3) of Carrier A.

(13) Carrier A increments the Network Counter field value to a value of 7 and the call continues to be in a looping state.

(14) Carrier A has an agreement with Carrier B to terminate some of its traffic so the call is provisioned to be sent to Carrier B for termination. The Hop Counter field value is 17 and the Network Counter field value is 7 before the call is processed by the access switch (SO 5) of Carrier B.

(15) Carrier B has detected that the Network Counter field has reached the threshold of 7 and the looped call should be killed. Now, the looped call will be terminated with a release signaling message with the "exchange routing error" cause code.

Additionally, the present inter-carrier loop detection methods and data structures can be represented by one or more software applications (or even a combination of software and hardware, e.g., using application specific integrated circuits (ASIC)), where the software is loaded from a storage medium, (e.g., a ROM, a magnetic or optical drive or diskette) and operated by the CPU in the memory of the switch. As such, the present inter-carrier looping detection methods and data structures of the present invention can be stored on a computer readable medium, e.g., RAM memory, ROM, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting inter-carrier looping in a first communication network, comprising:
   receiving a call with a network counter value, wherein said network counter value is representative of a number of networks that said call has traversed and said network counter value is carried within at least one unused bit within a network parameter;
   determining whether said network counter value is equal to a threshold value; and
   terminating said call if said network counter value is equal to said threshold value.

2. The method of claim 1, wherein said call is terminated by an access switch of the first communication network.

3. The method of claim 1, wherein the first communication network is using a SS7 signaling protocol, where said network counter value is carried within an initial address message (IAM).

4. The method of claim 1, wherein said network parameter further carries a hop counter value representative of a number of interexchange circuits that are allowed to complete said call.

5. The method of claim 1, wherein said threshold value is selectively set to a value between 1 and 7.

6. The method of claim 1, further comprising:
   incrementing said network counter value to a new network counter value if said network counter value is not equal to said threshold value.

7. The method of claim 6, further comprising:
   forwarding said new network counter value and said call to at least one intermediate switch of the first communication network or to an access switch of a second communication network.

8. The method of claim 7, wherein said second communication network is an interconnecting carrier or an egress carrier.

9. The method of claim 7, wherein said new network counter value is not incremented by said at least one intermediate switch.

10. The method of claim 1, further comprising:
    setting an initial value to said network counter value if said network counter value is not set and said network counter value is needed for an outgoing message.

11. The method of claim 1, wherein said terminating said call comprises:
    releasing said call with a release message with a cause value representative of an exchange routing error.

12. An apparatus for detecting inter-carrier looping in a communication network, said apparatus comprising:
    means for receiving a call with a network counter value, wherein said network counter value is representative of a number of networks that said call has traversed and said network counter value is carried within at least one unused bit within a network parameter;
    means for determining whether said network counter value is equal to a threshold value; and
    means for terminating said call if said network counter value is equal to said threshold value.

13. The apparatus of claim 12, wherein said apparatus is an access switch of the communication network.

14. The apparatus of claim 12, wherein the communication network is using a SS7 signaling protocol, where said network counter value is carried within an initial address message (IAM).

15. The apparatus of claim 12, further comprising:

means for incrementing said network counter value to a new network counter value if said network counter value is not equal to said threshold value.

16. The apparatus of claim 15, further comprising:

means for forwarding said new network counter value and said call to an intermediate switch of the communication network or to an access switch of a second communication network.

17. A computer-readable medium having stored thereon a plurality of instructions, the plurality of instructions Including instructions which, when executed by a processor, cause the processor to perform the steps comprising of:

receiving a call with a network counter value, where said network counter value is representative of a number of networks that said call has traversed and said network counter value is carried within at least one unused bit within a network parameter determining whether said network counter value is equal to a threshold value; and terminating said call if said network counter value is equal to said threshold value.

18. The computer-readable medium of claim 17, wherein the steps are performed in a communication network using a SS7 signaling protocol, where said network counter value is carried within an initial address message (IAM).

19. The computer-readable medium of claim 17, further comprising:

incrementing said network counter value to a new network counter value if said network counter value is not equal to said threshold value.

20. The computer-readable medium of claim 19, further comprising:

forwarding said new network counter value and said call to at least one intermediate switch of the communication network or to an access switch of a second communication network.

\* \* \* \* \*